United States Patent
Lifschultz

(10) Patent No.: US 9,832,262 B1
(45) Date of Patent: Nov. 28, 2017

(54) INFORMATION EXCHANGING SYSTEM

(71) Applicant: David Lifschultz, Northbrook, IL (US)

(72) Inventor: David Lifschultz, Northbrook, IL (US)

(*) Notice: Subject to any disclaimer, the term of this patent is extended or adjusted under 35 U.S.C. 154(b) by 31 days.

(21) Appl. No.: 14/728,776

(22) Filed: Jun. 2, 2015

Related U.S. Application Data

(60) Provisional application No. 62/066,674, filed on Oct. 21, 2014.

(51) Int. Cl.
| | |
|---|---|
| *H04W 4/00* | (2009.01) |
| *H04L 29/08* | (2006.01) |
| *H04W 76/02* | (2009.01) |
| *H04B 5/00* | (2006.01) |

(52) U.S. Cl.
CPC ....... *H04L 67/1095* (2013.01); *H04B 5/0031* (2013.01); *H04W 4/008* (2013.01); *H04W 76/023* (2013.01)

(58) Field of Classification Search
CPC .................................................. H04W 4/008
USPC ...................................... 455/41.1, 41.2, 41.3
See application file for complete search history.

(56) References Cited

U.S. PATENT DOCUMENTS

| | | | | |
|---|---|---|---|---|
| 8,219,028 B1* | 7/2012 | Flamholz | ............ | G06F 1/1694 455/41.2 |
| 8,634,848 B1* | 1/2014 | Bozarth | ............ | H04W 64/00 455/41.2 |
| 2008/0170690 A1* | 7/2008 | Tysowski | ............ | H04L 51/14 380/270 |
| 2012/0214416 A1* | 8/2012 | Kent | ............ | H04L 63/18 455/41.2 |
| 2013/0324169 A1* | 12/2013 | Kamal | ............ | H04W 4/008 455/466 |
| 2014/0148094 A1* | 5/2014 | Park | ............ | G06Q 50/01 455/41.1 |

* cited by examiner

*Primary Examiner* — Wen Huang
(74) *Attorney, Agent, or Firm* — Plager Schack LLP; Mark H. Plager

(57) ABSTRACT

A system for facilitating personal information exchange includes a first computer peripheral device comprising a first near field communication system. A second computer peripheral device includes a second near field communication system. The first near field communication system is communicatively coupled to the second near field communication system. A web server is communicatively coupled to the first computer peripheral device and the second computer peripheral device. The web server is configured to receive personal information from the first computer peripheral device and the second computer peripheral device into a database. The near field communication between the first computer peripheral device and the second computer peripheral device results in sharing the information in the database.

7 Claims, 8 Drawing Sheets

INFORMATION EXCHANGING SYSTEM

CLAIM OF BENEFIT TO PRIOR APPLICATION

This application claims benefit to U.S. Provisional Patent Application 62/006,674, entitled "INFORMATION EXCHANGING SYSTEM," filed Jun. 2, 2014. The U.S. Provisional Patent Application 62/006,674 is incorporated herein by reference.

BACKGROUND

The embodiments herein relate generally to systems that facilitate the exchange of information. Prior to embodiments of the disclosed invention, with the advent of mobile phones and social networking people do not have a way to exchange contact information electronically with people the way they do in the real world.

For instance, when two mobile device users encounter each other, they may wish to exchange contact information, but without a convenient electronic manner of exchanging such information, one or both of the users may then resort to manually inputting the other user's contact information into their respective mobile device. This manual process is generally prone to user error and is often slower than an electronic exchange of information. Naturally, many users of computing devices find this to be a problem.

Therefore, what is needed is a way to electronically and conveniently exchange personal information, such as contact information.

BRIEF DESCRIPTION

Some embodiments include a novel information exchanging system and a plurality of novel information exchanging processes that facilitate personal information exchange between users of digital electronic devices.

In some embodiments, the information exchanging system includes a first computing device with a first near field communication system and a second computing device with a second near field communication system. In some embodiments, the information exchanging system facilitates the exchange of personal information between users of the first computing device and the second computing device when the first near field communication system is communicatively coupled to the second near field communication system. In some embodiments, the information exchanging system further includes a web server computing device that is communicatively coupled to the first computing device and the second computing device. In some embodiments, the web server computing device includes a processor, a database, and an information exchanging program. In some embodiments, when the information exchanging program is running on the processor, the web server computing device is configured to receive personal information from the first computing device and the second computing device and to store the received personal information in the database. Once the devices are linked, the near field communication between the first computing device and the second computing device results in sharing the required information in the database.

In some embodiments, the plurality of information exchanging processes includes a plurality of information exchange establishment processes that establish a connection to exchange personal information between a first computing device and a second computing device. In some embodiments, the plurality of information exchange establishment processes comprises an information exchange request process and an information exchange acceptance process.

In some embodiments, the plurality of information exchanging processes includes an information update process for updating information exchanged between the first computing device and the second computing device.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
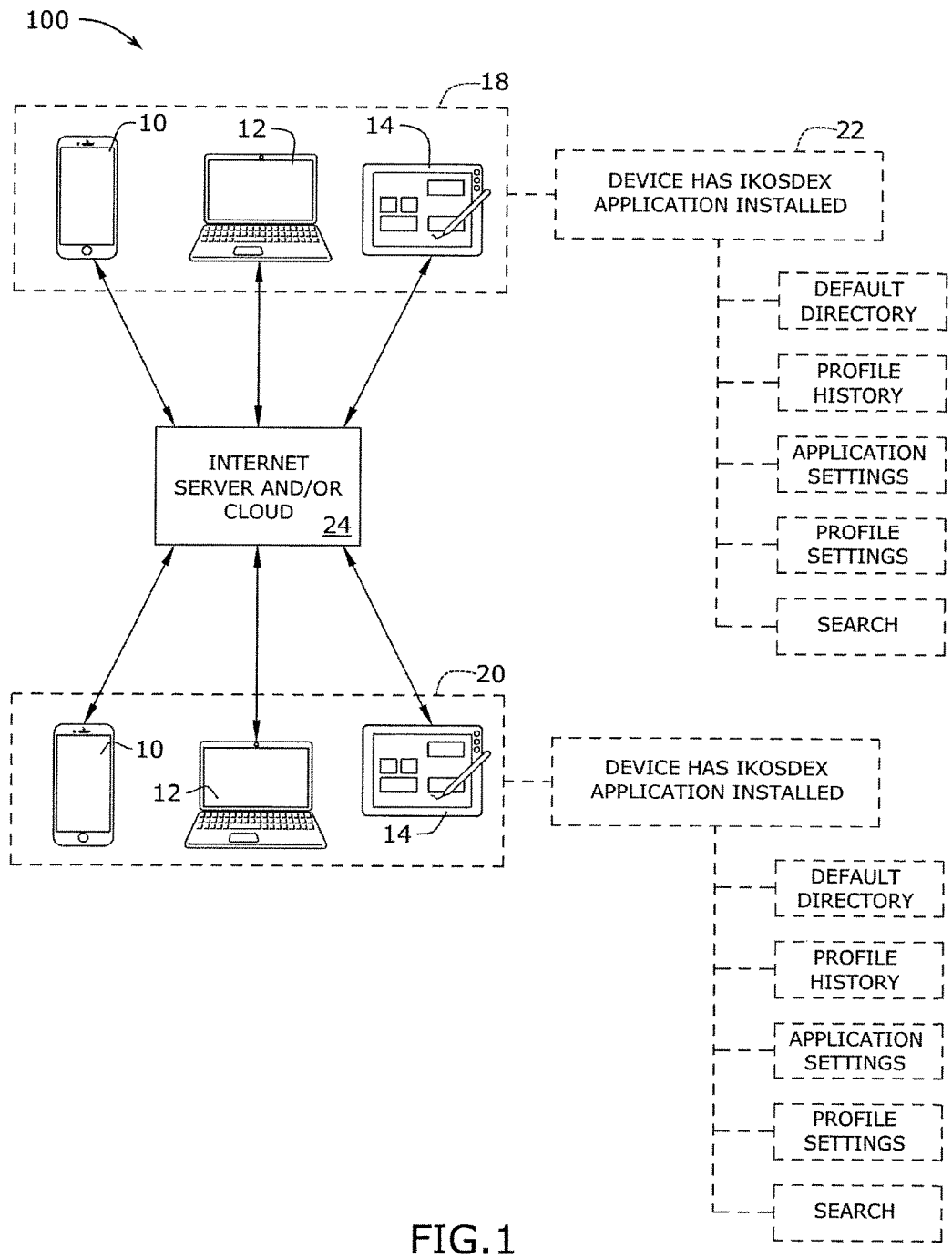

Having thus described the invention in general terms, reference is now made to the accompanying drawings, which are not necessarily drawn to scale, and which show different views of different example embodiments, and wherein:

FIG. 1 conceptually illustrates an architecture of an information exchanging system in some embodiments.

Figure 2:
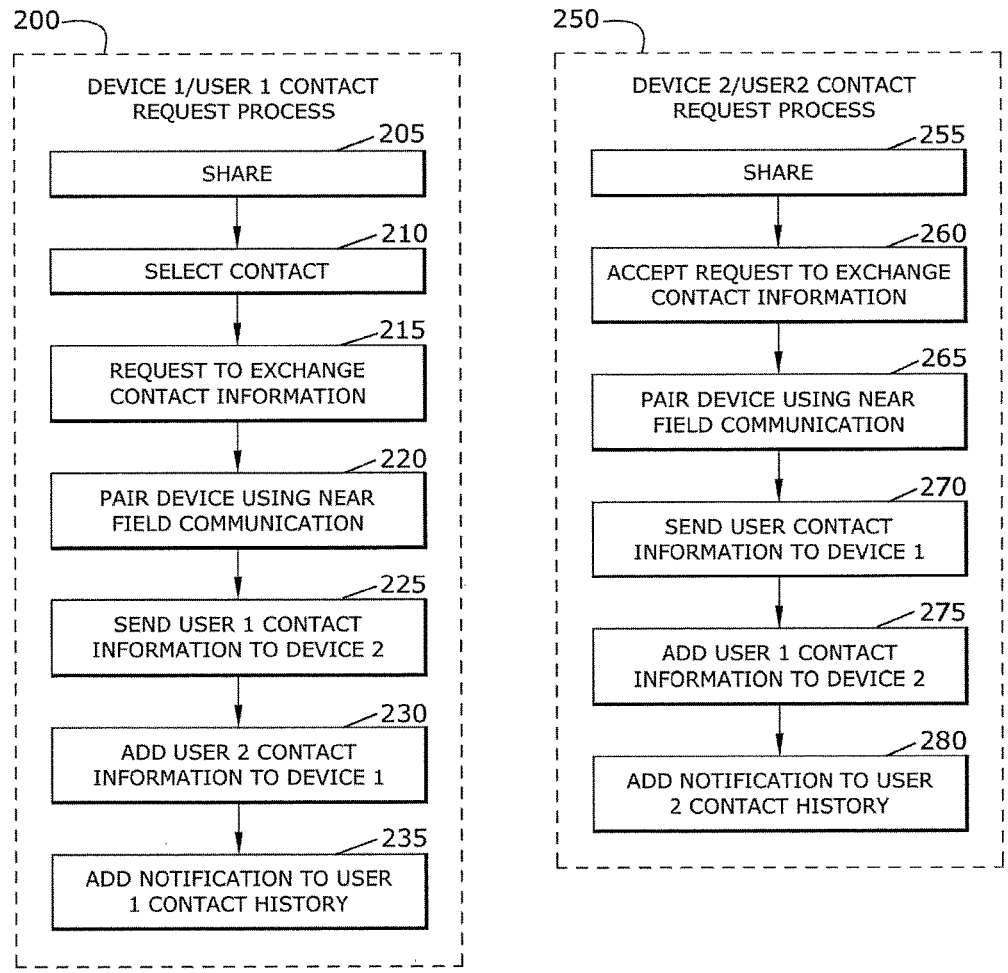

FIG. 2 conceptually illustrates corresponding processes for exchanging information between two devices in some embodiments.

Figure 3:
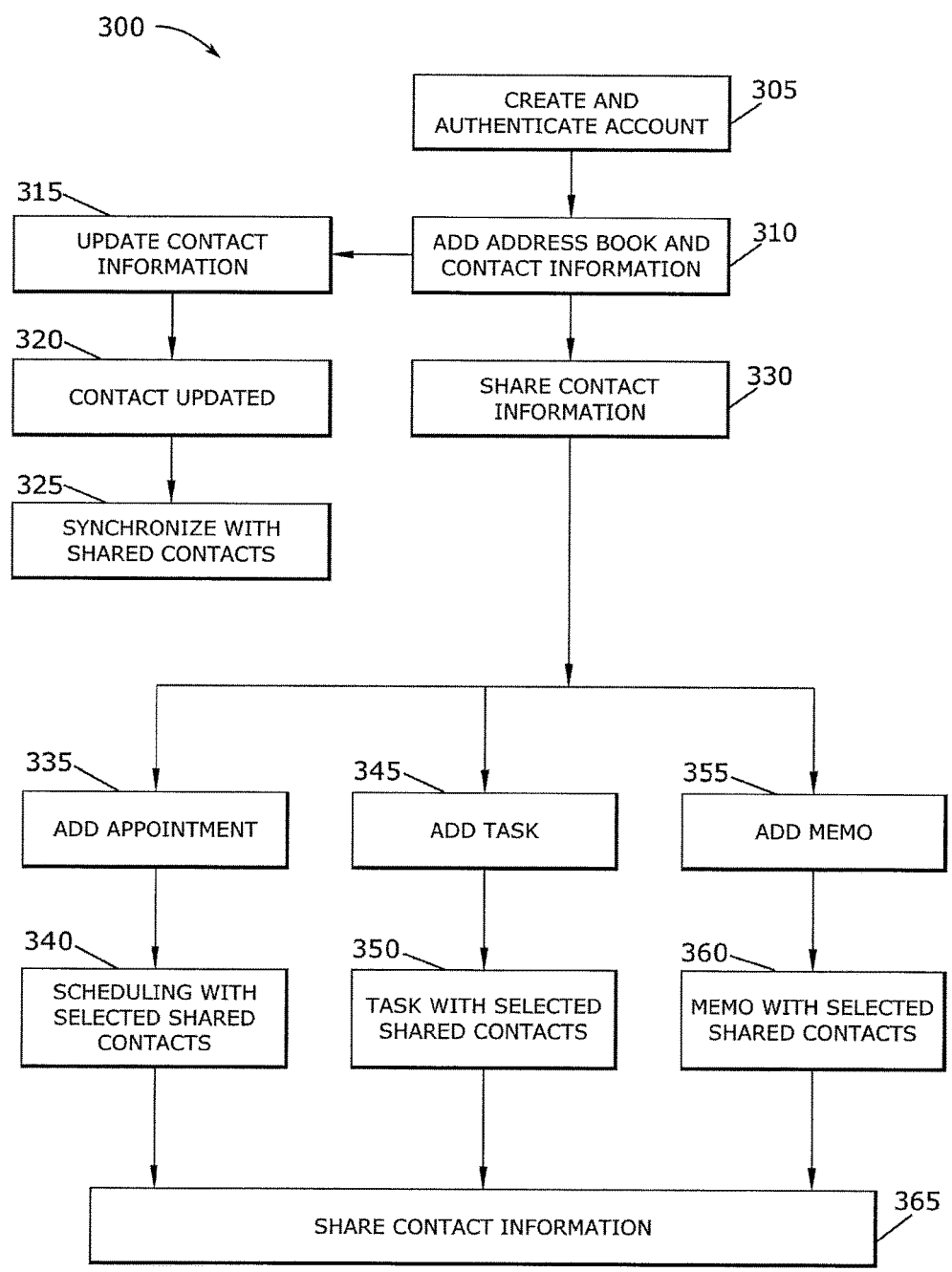

FIG. 3 conceptually illustrates a process for using an information exchanging system in some embodiments.

Figure 4:
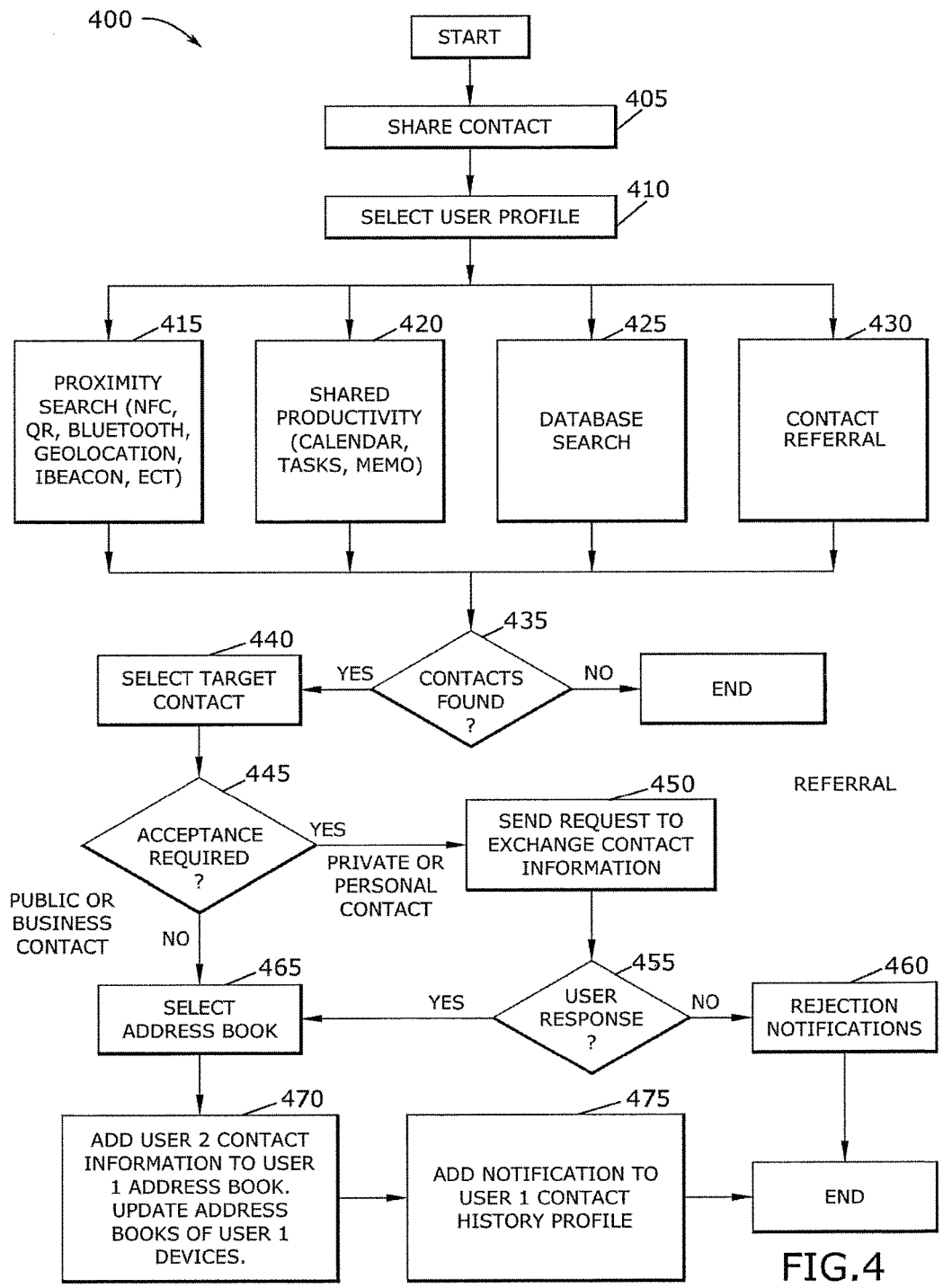

FIG. 4 conceptually illustrates a process for requesting information exchange in some embodiments.

Figure 5:
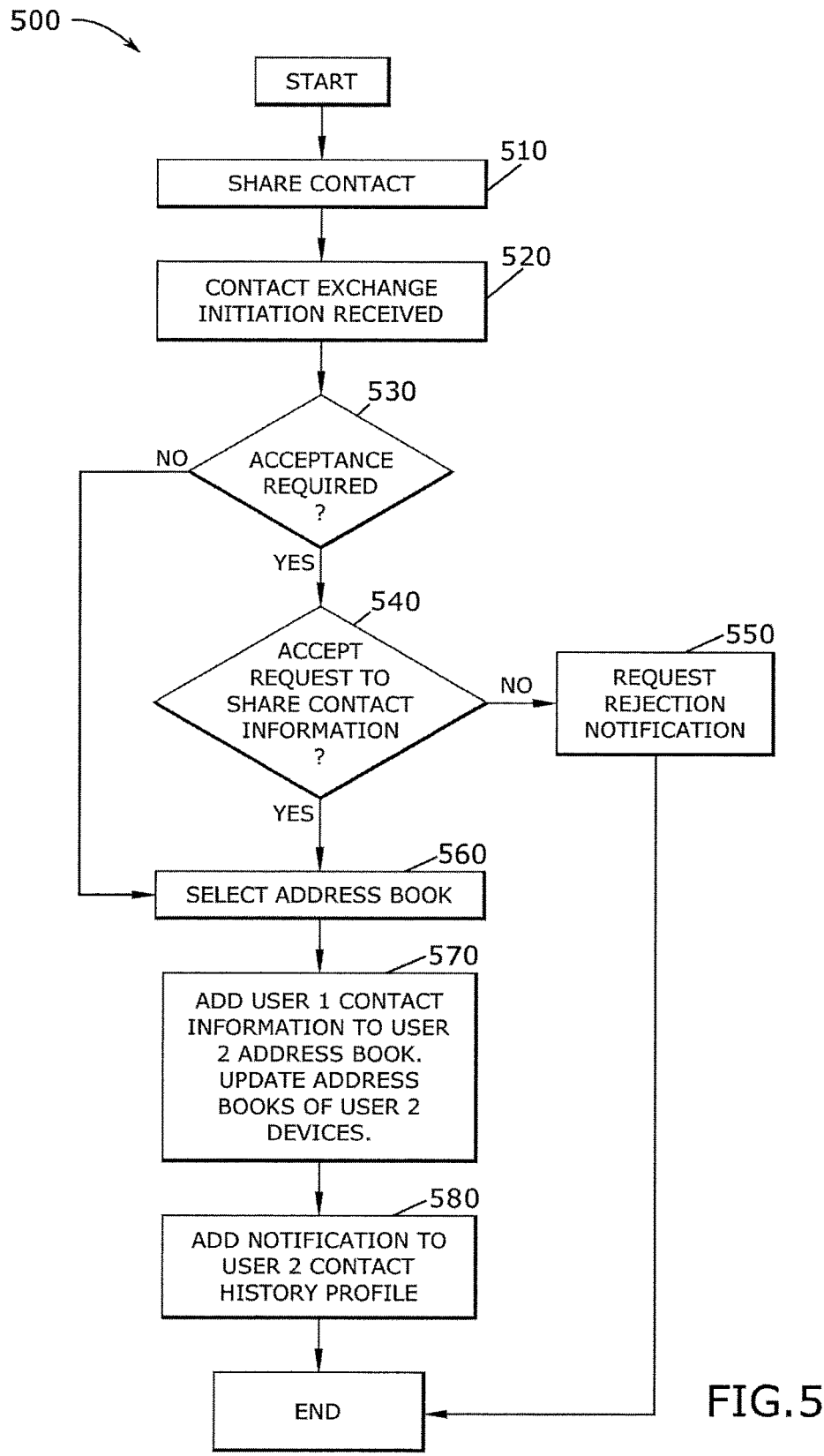

FIG. 5 conceptually illustrates a process for accepting an information exchange request in some embodiments.

Figure 6:
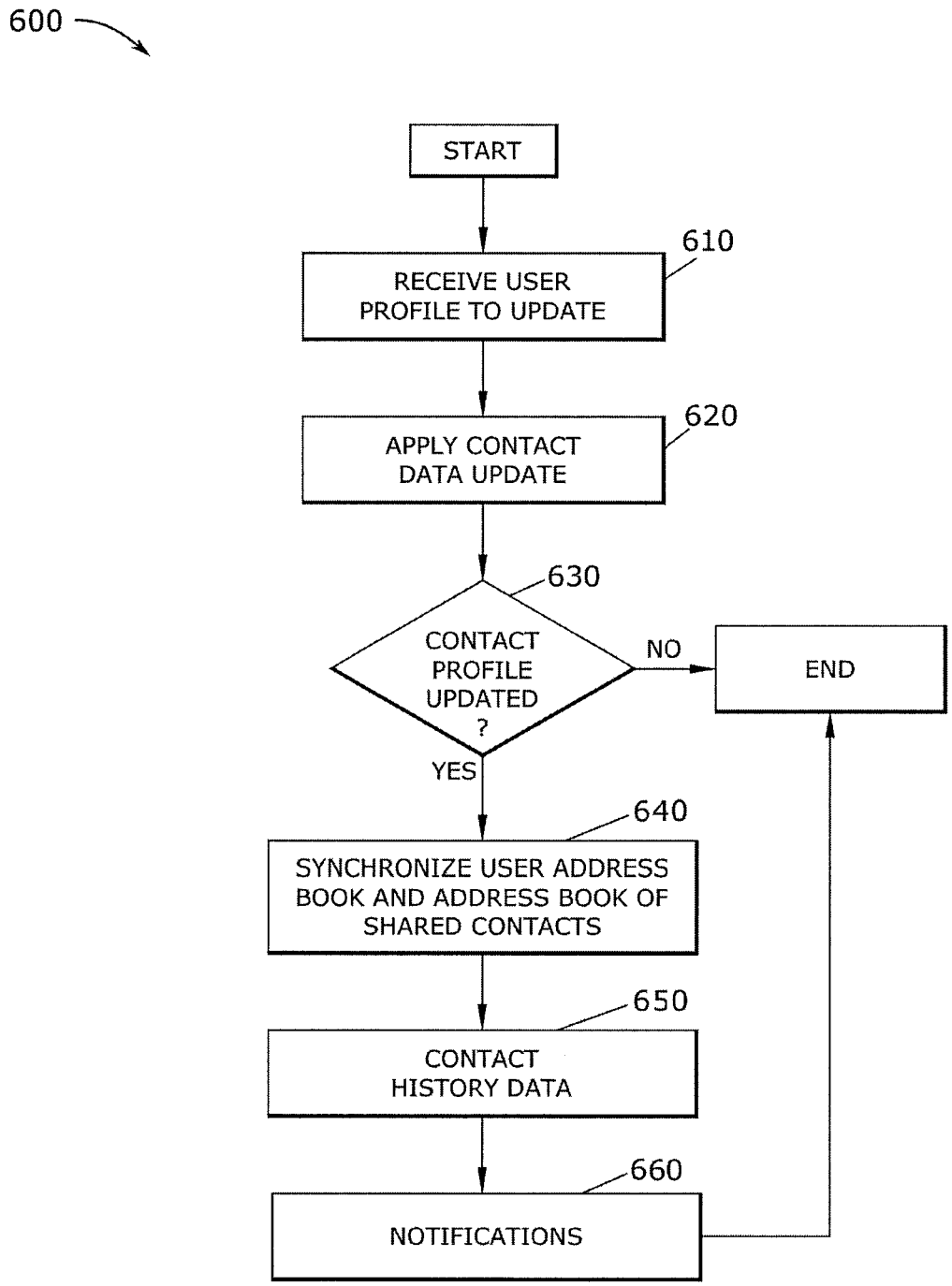

FIG. 6 conceptually illustrates a process for updating contact information associated with contact information received during an exchange of information in some embodiments.

Figure 7:
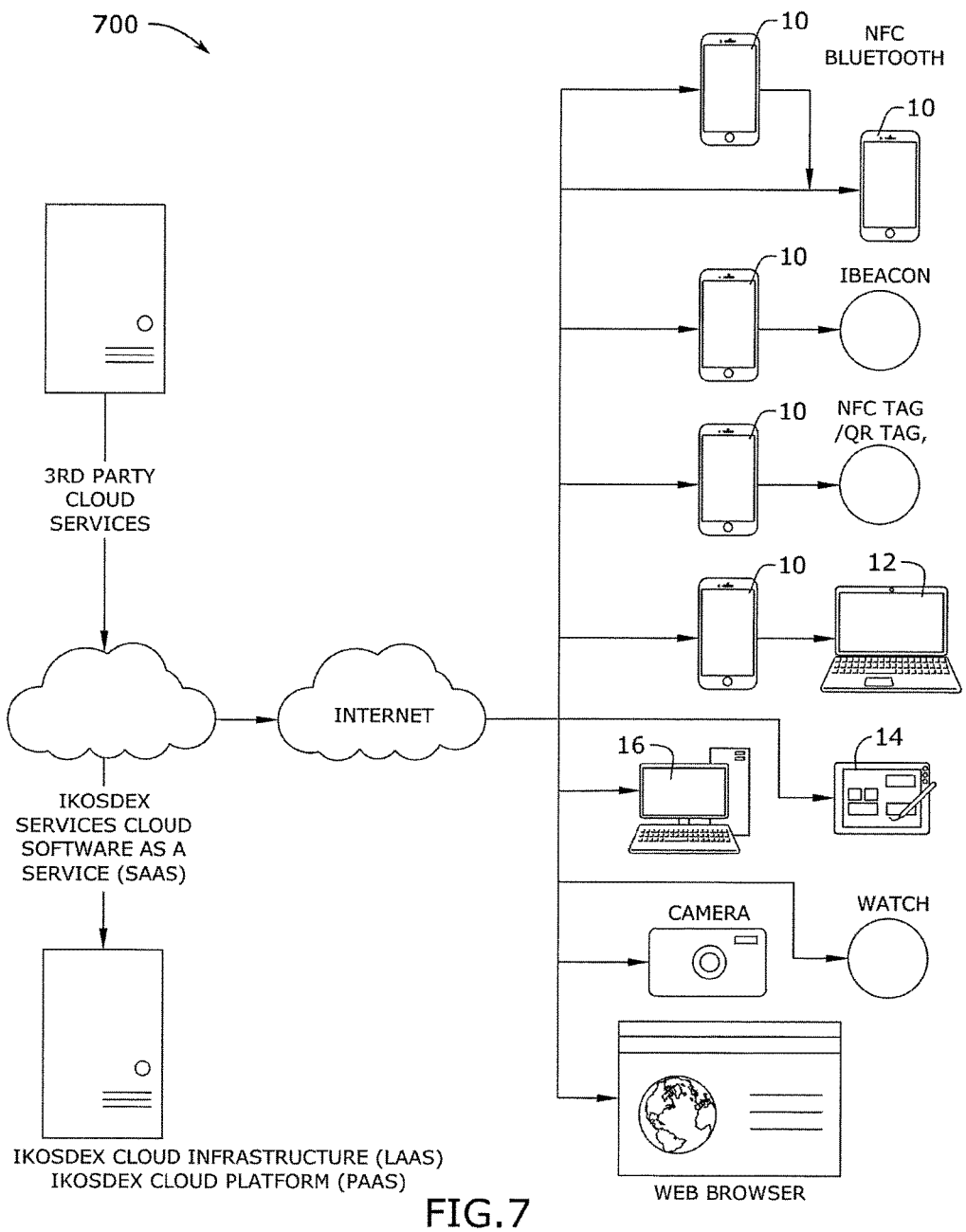

FIG. 7 conceptually illustrates a network architecture of an information exchanging system in some embodiments.

Figure 8:
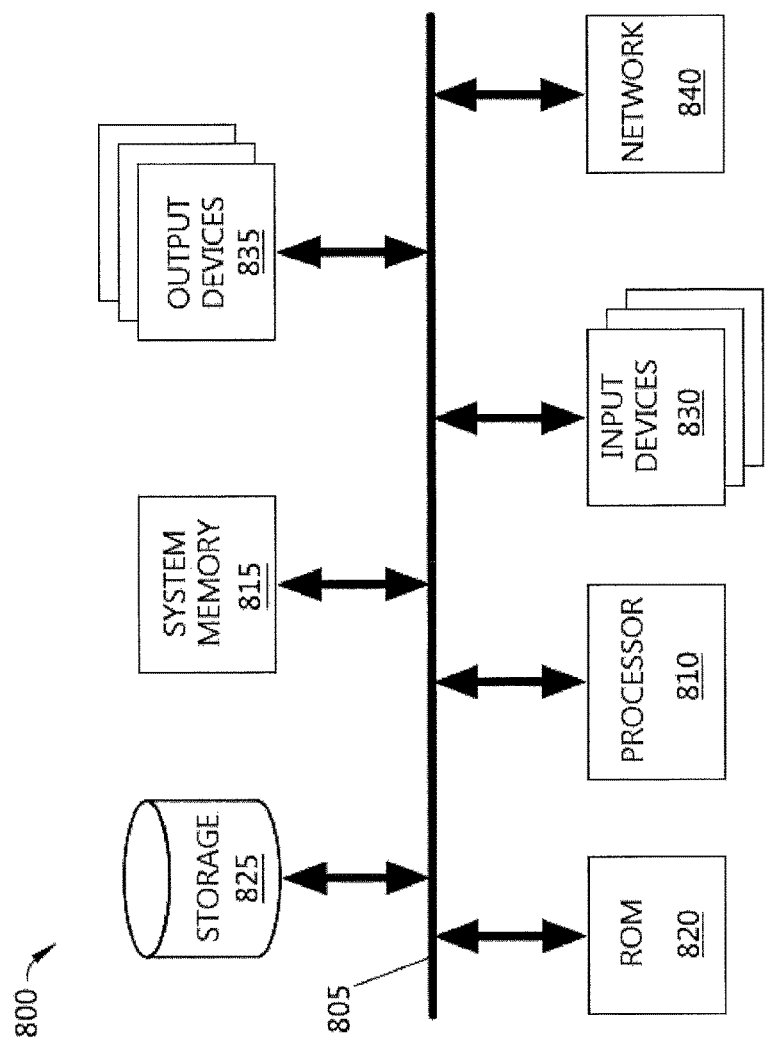

FIG. 8 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

As noted above, with the advent of mobile phones and social networking, many people (hereinafter referred to in the singular as a "user" and in the plural as "users") who use computing devices (e.g., mobile computing devices such as tablets or smartphones, standard computing devices such as desktop computers or laptop computers, etc.) do not have convenient ways to exchange personal information (such as contact information, calendar information, task and project information, etc.) electronically in the spirit of the internet with other users. For instance, when a first user of a mobile device encounters a second user of a mobile device, the first user and second user may wish to exchange contact information, but without a convenient electronic manner of exchanging such information, one or both of the first user and the second user are left to manually input the other user's contact information into their respective mobile device. This manual process is generally prone to user error and is often slower than an electronic exchange of information. Adding to this difficulty is the fact that a user might have contact information and other bulk information (e.g., task information, project information, calendar-related information, etc.) in relation to every contact that user knows, and periodically that user may encounter situations in which he or she would like to share a variety of personal information related to several contacts (or even all contacts the user knows). The user may also want to share personal information in a consistent and secure way between various platforms and applications that use this information. Naturally, many users of computing devices find this to be a problem. Embodiments of the invention described in this disclosure solve such problems by way of a novel information exchanging system and a plurality of novel information exchanging processes that facilitate personal information exchange between users of digital electronic devices.

In some embodiments, the information exchanging system includes a first computing device with a first near field communication system and a second computing device with a second near field communication system. In some embodiments, the information exchanging system facilitates the exchange of personal information between users of the first computing device and the second computing device when the first near field communication system is communicatively coupled to the second near field communication system.

In some embodiments, the information exchanging system includes coordinating software, which is described in further detail below. The coordinating software may take the form of one or more computer programs or software applications (hereinafter referred to as "application" or "software application"). In some cases, an application is configured to run on a particular computing device and may be downloaded from an application store onto the respective computing device. In some embodiments, personal and/or contact information can be stored in a memory or data storage unit of the computing device independent of the application, in a plurality of other applications, or elsewhere in memory or data storage. For example, contact information associated with the first computing device can be exchanged with the second computing device upon a successful near field communication or other communication connection between the first computing device and the second computing device. Alternatively, or in conjunction with exchanging contact information, the contact information on the first computing device can be compared to and/or synchronized with the contact information on the second computing device to determine mutually known contacts. In some cases, a user of the first computing device who receives a request from the application running on the second computing device can either push information to the second computing device or not, depending on the user's preferences.

In some embodiments, if two computing devices cannot pair together, for example because of a physical obstacle, the users in proximity would need to be determined from GPS and then paired and shared through other means, such as by an Internet connection. Thus, in some embodiments, the information exchanging system includes a web server computing device that is communicatively coupled to the first computing device and the second computing device. In some embodiments, the web server computing device includes a processor, a database, and an information exchanging program. In some embodiments, when the information exchanging program is running on the processor, the web server computing device is configured to receive personal information from the first computing device and the second computing device and to store the received personal information in the database. Once the devices are linked, the near field communication between the first computing device and the second computing device results in sharing the required information in the database.

By way of example, FIG. 1 conceptually illustrates an architecture of an information exchanging system 100 that facilitates personal information exchange between users of digital electronic devices. As shown in this figure, the information exchanging system 100 facilitates electronic information exchange between computing devices that have an application 22 (e.g., "IKOSDEX" as it may be called in some embodiments) installed which is associated with the information exchanging system 100. The computing devices shown in this example include a set of hand-held mobile computing devices 10, a set of laptop computers 12, and a set of tablet computing devices 14. A first set of proximate devices 18 is shown by a dashed line box that surrounds one of the mobile computing devices 10, one of the laptop computers 12, and one of the tablet computing devices 14. Similarly, a second set of proximate devices 20 is shown by a dashed line box that surrounds another one of the mobile computing devices 10, another one of the laptop computers 12, and another one of the tablet computing devices 14. In this example, each of the computing devices within the first set of proximate devices 18 is in close enough physical proximity to be able to make a successful near field communication connection with one or more of the other computing devices in the first set of proximate devices 18. Likewise, each of the computing devices within the second set of proximate devices 20 is in close enough physical proximity to be able to make a successful near field communication connection with one or more of the other computing devices in the second set of proximate devices 20.

Each of the hand-held mobile computing devices 10, laptop computers 12, and tablet computing devices 14 includes the software application 22 installed. In some embodiments, the software application 22, when running on the respective computing device on which it is installed, includes a set of structured tools and resources for interacting with the information exchanging system 100 and/or any one or more of the other computing devices (including computing devices that are not physically close enough to establish a near field communication connection). The set of structured tools and resources of the software application 22 may include, without limitation, a default directory (e.g., a default address book where the user has organized known contacts into multiple address books, such as personal contacts, work contacts, professional contacts, etc.), a profile history, application settings, profile settings, and a search tool (e.g., a tool to search the database for contacts that may not be in proximity).

By way of example, when two or more of the computing devices are used in close proximity of each other, in some instances, the users of the computing devices may wish to exchange personal information. Thus, a user of mobile computing device 10 and a user of laptop computer 12 in the first set of proximate devices 18 may establish a near field communication connection and exchange information as desired. In another example, however, the user of the mobile device 10 in the first set of proximate devices may not be in close enough physical proximity to a user of any computing device (e.g., the mobile device 10, the laptop 12, and tablet 14) in the second set of proximate devices 20. In this example, the exchange of the personal information is facilitated by the information exchanging system 100, which further includes a web server 24 that is accessible by each computing device (i.e., the mobile computing device 10 in the first set of proximate devices 18 and any of the computing devices in the second set of proximate devices 20) over the Internet (e.g., a "cloud" service for exchanging personal information).

While FIG. 1 provides a conceptual illustration of an example architecture of the information exchanging system 100, a person skilled in the relevant art would appreciate that there are more details involved in connected two or more computing devices in a way that allows them to exchange personal information. For example, one of the mobile computing devices 10 may be a first computing device associated with a first user. The first computing device may include a first near field communication system. Additionally, one of the tablet computing devices 14 may be a second computing device associated with a second user, and the second computing device may be outfit with a second near field communication system. When the first user and the second user wish to exchange personal electronic information and are in proximity of each other, the first near field communication system of the first computing device may then become communicatively coupled to the second near field communication system of the second computing device. Furthermore, the web server 24 may present to which each of the first computing device and the second computing device becomes communicatively coupled, regardless of whether or not they establish a near field communication connection. When the web server 24 provides the cloud service for exchanging personal information between two or more computing devices with the software application 22 installed, then the first computing device and/or the second computing device may provide the electronic personal information intended to be exchanged with the other computing device. The web server 24 may be configured to receive such electronic personal information from each of the first second computing devices, and may then store the received data in a database.

In some cases, a near field communication connection between the devices is needed in order to exchange the information. For example, the web server 24 may only receive the required electronic personal information from the first and second computing devices when an electronic "handshake" connection between the first near field communication system and the second near field communication system is successful. In some cases, a successful "handshake" connection is contingent upon establishing a near field wireless communication connection between the first and second near field communication systems and upon express approval of the first and second users of the first and second computing devices, respectively. When the "handshake" connection is established and successful, the required electronic personal information is shared between the first computing device and the second computing device. In some embodiments, the required electronic personal information is also shared through the cloud service by way of the web server 24 and the database.

In this specification, near field communication includes NFC, Bluetooth and other communication technologies or protocols used in communication when devices are contacted physically (e.g., touching smartphones together to transfer personal information via NFC) and/or in close physical proximity (e.g., using Bluetooth to transfer information to a nearby device). Additionally, in this specification, there are several descriptions of methods and processes that are performed in connection with exchanging electronic information between computing devices. However, it should be noted that for the purposes of the embodiments described in this specification, the word "method" is used interchangeably with the word "process". Methods performed by the information exchanging system and/or software running on a user's computing device while accessing and interacting with the information exchanging system are described, therefore, by reference to several example processes that conceptually illustrate process steps for establishing near field communication connection and exchanging information between two or more computing devices and/or facilitating information exchange between computing devices.

By way of example, FIG. 2 conceptually illustrates corresponding processes 200 and 250 for exchanging information between two devices. In this example, two users (i.e., "USER 1" and "USER 2") are in close proximity with each other and "USER 1" would like to exchange contact information with "USER 2". As shown in this figure, the process 200 starts when "USER 1" chooses to share (at 205) information. For example, "USER 1" may launch an application on a mobile device and select a tool from a graphical user interface (GUI) to share contact information. Next, the process 200 receives a selection of a contact (at 210) whom "USER 1" wishes to exchange the contact information. In this example, "USER 1" has selected to share contact information with "USER 2". The process 200 then receives a selection to make a request to exchange contact information (at 215) with "USER 2".

Turning to the process 250, when "USER 2" is running the application to share information (at 255), the request to exchange information from "USER 1" is received at the device. Next, the process 250 receives a selection from "USER 2" to accept (at 260) the request to exchange contact information.

After "USER 1" selects "USER 2" as the contact to exchange the contact information the process 200 attempts to pair (at 220) the computing device of "USER 1" with the computing device of "USER 2" using near field communication (NFC). Contemporaneously with process 200 pair the device using NFC, the process 250 also attempts to pair (at 265) the computing device of "USER 2" with the computing device of "USER 1".

Once the NFC connection pairs the computing device of "USER 1" and the computing device of "USER 2", the process 200 sends (at 225) the contact information of "USER 1" to the computing device of "USER 2". Likewise, the process 250 sends (at 270) the contact information of "USER 2" to the computing device of "USER 1".

Next, the process 200 adds (at 230) contact information from "USER 2" to the computing device of "USER 1", and the process 250 adds (at 275) contact information from "USER 1" to the computing device of "USER 2". Finally, the process 200 adds (at 235) a notification to "USER 1" contact history, and process 250 adds (at 280) a notification to "USER 2" contact history. While the near field communication system used in this example is NFC, a person skilled in the art would appreciate that another type of near field communication system could be used in the alternative, such as Bluetooth, without changing the steps of the process 200.

Turning to another example, FIG. 3 conceptually illustrates a process 300 for using an information exchanging system. In some embodiments, a user will access the information exchanging system over a network, such as a wireless network, the Internet (the "cloud"), or another network. In some embodiments, the process 300 starts when the user attempts to login or generate an account. At that point, the process 300 creates and authenticates (at 305) the account. Next, the process 300 adds (at 310) address book and contact information. In some embodiments, the process 300 recognizes that existing contact information is already available, so the process 300 then updates (at 315) the contact information. For instance, the user has change mobile phone devices and now has a new telephone number which the process 300 recognizes as a field to update and share with all of the shared contacts. Upon the contact being updated (at 320), the process 300 then synchronizes (at 325) with shared contacts. Thus, for example, if the user has a new phone number, all of the shared contacts would get the updated telephone number synchronized to their own address books.

Referring back to the process 300 adding the address book and contact information (at 310), in some embodiments, the process 300 then shares (at 330) the contact information based on privacy settings. In some embodiments, one or more of three options to continue exist. During a first option, the process 300 adds (at 335) an appointment and then performs scheduling (at 340) with selected shared contacts. The process 300 then shares (at 365) the contact information based on privacy settings. During a second option, the process adds (at 345) a task and then assigns the task (at 350) with selected shared contacts. The process 300 then shares (at 365) the contact information based on privacy settings. During a third option, the process 300 adds (at 355) a memo and then shares the memo (at 360) with selected shared contacts. The process 300 then shares (at 365) the contact information based on privacy settings. In some embodiments, the process 300 also may have the option to share contact information from a list of mutual contacts created from shared productivity.

Although the process 200, described above by reference to FIG. 2, provides a high-level overview of how a user might request a connection with another device of another user in order to exchange personal information, FIG. 4 conceptually illustrates a process 400 for requesting information exchange. The process 400 may be performed by a software application with a user interacting with the software. For example, a user may have IKOSDEX installed on a mobile computing device and may interact with a graphical user interface (GUI) of the IKOSDEX application in order to exchange information with another user of the application.

In some embodiments, the process 400 receives a user selection to share (at 405) contact information. The process 400 then receives a selection (at 410) of a user profile. In particular, a user can have multiple contact profiles (e.g., work, charity, friends, neighbors, etc.) and may first choose one of the contact profiles to share with another user. For example, a first user wishes to share "work" contact profile contact information with a second user, so the first user selects the "work" contact profile to share with the second user. Next, the process 400 performs any one of four operations that can be selected by the user.

During a first option, the process 400 performs a proximity search (at 415). For instance, the process may use NFC, QR code, Bluetooth, geolocation, i-beacon, or other mechanisms for identifying others in close proximity to the mobile device of the user.

During a second option, the process 400 performs shared productivity type operations (at 420). For example, the process may update calendars, tasks, memos, etc., with existing contacts. During a third option, the process 400 performs a database search (at 425). In a fourth option, the process 400 makes a contact referral (at 430).

When the user completes one or more of the four options outlined above, the process 400 then determines (at 435) whether any contacts were found. If no contact was found, the process 400 ends. On the other hand, when one or more contacts are found, the process 400 of some embodiments receives a selection of a target contact (at 440). The process 400 then determines (at 445) whether acceptance from the target contact is required or not. When acceptance is required, the process 400 of some embodiments sends, to the contact, a request (at 450) to exchange contact information. Then the process 400 transitions to 455 to determine whether there is a user response. In some embodiments, if the target user does not respond immediately, the request is placed in a list of requests until an action is taken. On the other hand, when the request is denied, the process 400 sends rejection notifications (at 460). Then the process 400 ends. On the other hand, when there is an acceptance user response, the process 400 of some embodiments receives selection of an address book, which is described in further detail below.

Referring back to the decision at 445, when acceptance from the target contact is not required, the process 400 of some embodiments receives a selection (at 465) of an address book. Next, the process 400 adds (at 470) the target contact information (e.g., "USER 2" information) to the address book on the mobile device of the user interacting with the information exchanging system. The process 400 also updates the address books of the devices of the users. After adding/updating the contact information, the process 400 then adds (at 475) notification to the user's contact history profile. Then the process 400 ends.

Assuming the other user wishes to exchange personal information, FIG. 5 conceptually illustrates a process 500 for accepting an information exchange request. The process 500 may be performed by the software application running on the target contact's mobile device. In some embodiments, the process 500 starts when the user decides to share contact (at 510) information. The process 500 receives initiation of a contact exchange (at 520). For instance, a request to exchange contact information is received on the mobile device of USER 2 from the mobile device of USER 1.

Next, the process 500 determines (at 530) whether acceptance is required. When acceptance is not required, the process 500 transitions to 560 to selecting an address book, which is described in greater detail below. On the other hand, when acceptance is required, the process 500 then determines (at 540) whether to send an acceptance of the request or not. When the request to exchange contact information is not accepted, the process 500 responds to the request with a rejection notification (at 550). Then the process 500 ends.

On the other hand, when the request to exchange contact information is accepted, the process 500 receives selection of an address book (at 560). The process 500 uses the selected address book to then add (at 570) the received contact information of the other user to the contact list on the mobile device of the present user. Alternatively, or in conjunction with adding the contact information, the process of some embodiments may update the address books of the users. After adding/updating the user's contact information, the process 500 then adds (at 580) notification to the contact history profile of the user. The process 500 then ends.

If or after personal information, such as contact information, has been exchanged between computing devices, the information can be updated. By way of example, FIG. 6 conceptually illustrates a process 600 for updating contact information associated with contact information received during an exchange of information. The process 600 begins when it receives (at 610) a user profile to update. The process 600 then applies (at 620) the contact data update to the user profile selected for update. The process 600 then determines (at 630) whether the contact profile has been updated. When the contact profile has been updated, the process 600 ends.

On the other hand, if not adding a new contact, the process 600 synchronizes (at 640) the user address book and address book of shared contacts. After the contacts are mapped to each other's address books, the process 600 may see whether the user is updating their own profile and synchronize any such update with all shared contact. Then the process 600 updates contact history data (at 650) and adds notifications (at 660). Then the process 600 ends.

FIG. 7 conceptually illustrates a network architecture of an information exchanging system 700 in some embodiments. Similar to the system architecture described by reference to FIG. 1, the information exchanging system 700 of FIG. 7 includes a set of mobile computing devices 10, a laptop computer 12, and a tablet computer 14. These computing devices, along with a desktop computer 16, a camera, a watch, and a browser connect with other devices via NFC, Bluetooth, i-beacon, NFC tag, QR tag, wireless or wired Internet connection, and other data communication mechanisms in order to exchange personal information between two or more devices. The cloud service also facilitates the exchange of such information once connection is established and agreement to exchange the information is accepted.

Persons of ordinary skill in the art may appreciate that numerous design configurations may be possible to enjoy the functional benefits of the information exchanging system 700. Thus, given the wide variety of configurations and arrangements of embodiments of the information exchanging system, the scope of the information exchanging system is reflected by the breadth of the claims rather than narrowed by the embodiments and examples described above.

Also, many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 8 conceptually illustrates an electronic system 800 with which some embodiments of the invention are implemented. The electronic system 800 may be a computer, phone, PDA, or any other sort of electronic device. Such an electronic system includes various types of computer readable media and interfaces for various other types of computer readable media. Electronic system 800 includes a bus 805, processing unit(s) 810, a system memory 815, a read-only 820, a permanent storage device 825, input devices 830, output devices 835, and a network 840.

The bus 805 collectively represents all system, peripheral, and chipset buses that communicatively connect the numerous internal devices of the electronic system 800. For instance, the bus 805 communicatively connects the processing unit(s) 810 with the read-only 820, the system memory 815, and the permanent storage device 825.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 825.

Other embodiments use a removable storage device (such as a floppy disk or a flash drive) as the permanent storage device 825. Like the permanent storage device 825, the system memory 815 is a read-and-write memory device. However, unlike storage device 825, the system memory 815 is a volatile read-and-write memory, such as a random access memory. The system memory 815 stores some of the instructions and data that the processor needs at runtime. In some embodiments, the invention's processes are stored in the system memory 815, the permanent storage device 825, and/or the read-only 820. For example, the various memory units include instructions for processing appearance alterations of displayable characters in accordance with some embodiments. From these various memory units, the processing unit(s) 810 retrieves instructions to execute and data to process in order to execute the processes of some embodiments.

The bus 805 also connects to the input and output devices 830 and 835. The input devices enable the user to communicate information and select commands to the electronic system. The input devices 830 include alphanumeric keyboards and pointing devices (also called "cursor control devices"). The output devices 835 display images generated by the electronic system 800. The output devices 835 include printers and display devices, such as cathode ray tubes (CRT) or liquid crystal displays (LCD). Some embodiments include devices such as a touchscreen that functions as both input and output devices.

Finally, as shown in FIG. 8, bus 805 also couples electronic system 800 to a network 840 through a network adapter (not shown). In this manner, the computer can be a part of a network of computers (such as a local area network ("LAN"), a wide area network ("WAN"), or an intranet), or a network of networks (such as the Internet). Any or all components of electronic system 800 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1 and 4 conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A personal information exchanging system comprising:
a first computing device associated with a first user and comprising a first near field communication system that is configured to communicatively couple to a second near field communication system, a first processor, a first information exchanging software application, a first data storage device that stores the first information exchanging software application, a first contact history, and a first digital information directory, wherein the first information exchanging software application is configured to perform a first set of information exchanging operations when the first information exchanging software application is running on the first processor, wherein the first set of information exchanging operations comprise (i) receiving a selection to exchange digital information with another computing device identified by a selection of a target contact, (ii) sending a digital information exchange request to the computing device identified by the target contact, (iii) pairing the first computing device with the computing device identified by the target contact, (iv) retrieving a first set of digital information from the first digital information directory, (v) sending the first set of digital information to the computing device identified by the target contact, (vi) receiving a second set of digital information from the computing device identified by the target contact, (vii) adding the second set of digital information to the first digital information directory, and (viii) adding a notification to the first contact history;
a second computing device comprising the computing device identified by the target contact, said second computing device comprising the second near field communication system, a second processor, a second information exchanging software application, a second data storage device that stores the second information exchanging software application, a second contact history, and a second digital information directory, wherein the second near field communication system is configured to communicatively couple to the first near field communication system of the first computing device, wherein the second information exchanging software application is configured to perform a second set of information exchanging operations when the second information exchanging software application is running on the second processor and the second near field communication system is communicatively coupled to the first near field communication system, wherein the second set of information exchanging operations comprise (i) receiving the digital information exchange request from the first computing device, (ii) allowing the pairing of the first computing device with the second computing device, (iii) retrieving the second set of digital information from the second digital information directory, (iv) sending the second set of digital information to the first computing device, (v) receiving the first set of digital information from the first computing device, (vi) adding the first set of digital information to the second digital information directory, and (vii) adding a notification to the second contact history;
a web server communicatively coupled to the first computing device and the second computing device, wherein the web server comprises a personal information exchanging cloud service software application that is configured to (i) receive the first set of digital information at the web server from the first computing device and the second set of digital information at the web server from the second computing device and (ii) store the first set of digital information and the second set of digital information in a database, wherein near field communication between the first computing device and the second computing device results in sharing the first and second sets of digital information between the first computing device and the second computing device and synchronizing the first and second sets of digital information in the database, wherein the web server is configured to transmit the second set of synchronized digital information from the database to any computing device associated with the first user; and a third computing device associated with the first user and comprising a third processor, a third information exchanging software application, a third data storage device that stores the third information exchanging software application, a third contact history, and a third digital information directory, wherein the third information exchanging software application is configured to perform a third set of information exchanging operations when the third information exchanging software application is running on the third processor, wherein the third set of information exchanging operations comprise (i) connecting to the web server, (ii) receiving the second set of digital information from the web server, (iii) adding the second set of digital information to the third digital information directory, and (iv) adding a notification to the third contact history.

2. The personal information exchanging system of claim 1, wherein the first near field communication system comprises a first Bluetooth communication system, wherein the second near field communication system comprises a second Bluetooth communication system.

3. The personal information exchanging system of claim 1, wherein the first near field communication system comprises a first QR code tag communication system, wherein the second near field communication system comprises a second QR code tag communication system.

4. The personal information exchanging system of claim 1, wherein at least one of the first computing device and the second computing device comprises a mobile computing device.

5. The personal information exchanging system of claim 4, wherein the mobile computing device comprises at least one of a mobile smartphone computing device and a tablet computing device.

6. The personal information exchanging system of claim 1, wherein at least one of the first computing device and the second computing device comprises a workstation computing device.

7. The personal information exchanging system of claim 6, wherein the workstation computing device comprises at least one of a laptop computer and a desktop computer.

\* \* \* \* \*